Aug. 2, 1966 W. BAUMGARTEN 3,263,743
AIR-CONDITIONING APPARATUS
Filed Aug. 14, 1962 2 Sheets-Sheet 1

WILHELM BAUMGARTEN
INVENTOR.

BY
Mestern, Ross & Mestern

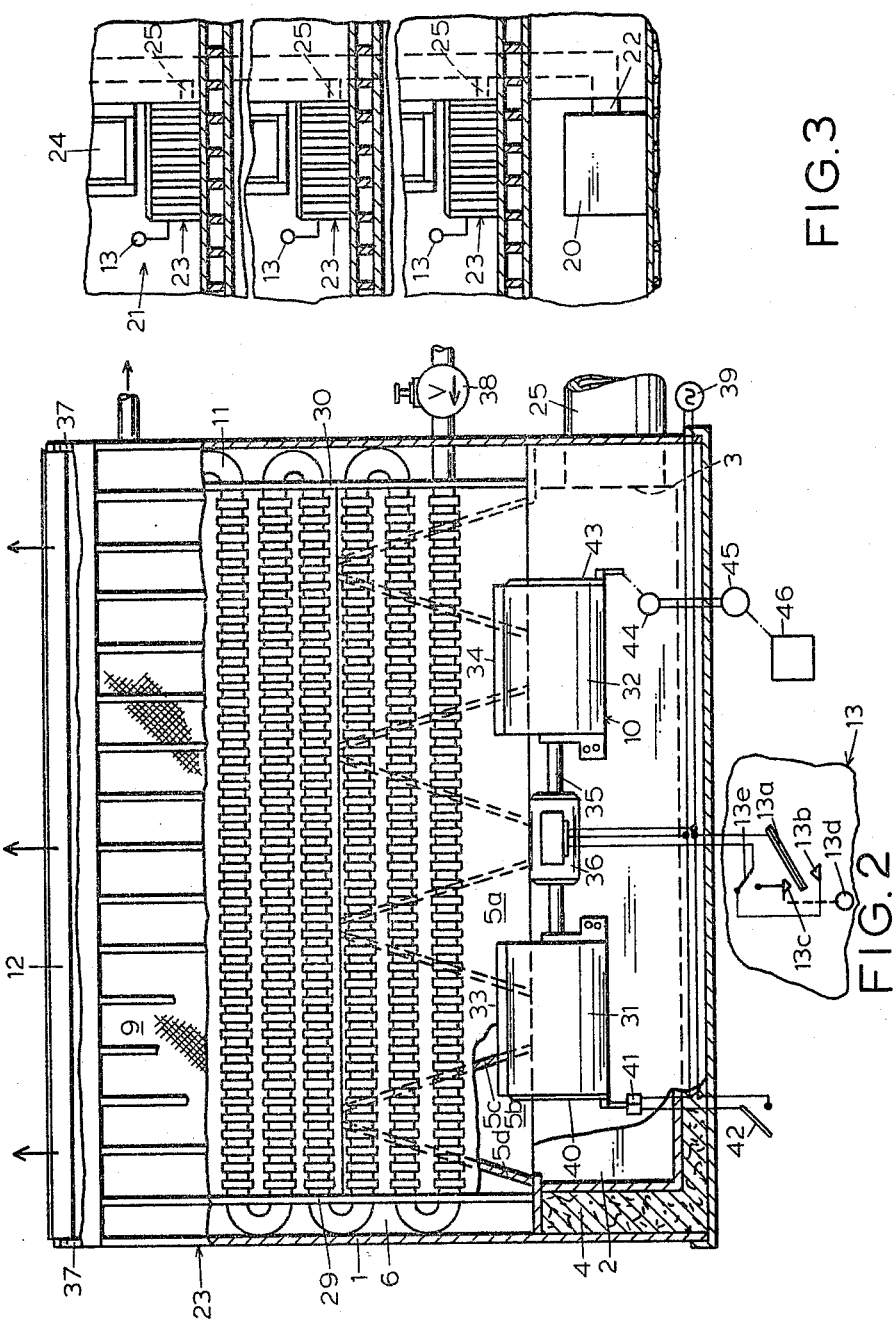

3,263,743
AIR-CONDITIONING APPARATUS

Wilhelm Baumgarten, Neu-Isenburg, Germany, assignor to Alfred Teves Maschinen- und Armaturenfabrik Kommandit-Gesellschaft, Frankfurt am Main, Germany, a corporation of Germany
Filed Aug. 14, 1962, Ser. No. 216,927
Claims priority, application Germany, Oct. 11, 1961, T 20,935
4 Claims. (Cl. 165—40)

My present invention relates to air-conditioning apparatus and, more particularly, to central air-conditioning units for the treatment of air at different locations.

High-pressure central air-conditioning installations are known wherein a primary flow of treated air from a centrally located unit is branched into various rooms in which it is admixed with the local or secondary air for heating, cooling, dehumidifying or other purposes. The secondary air stream is admixed with the primary air stream in an induction-type apparatus in which ambient air is drawn into a plenum chamber wherein the primary air is discharged through one or more nozzles at which a reduced pressure is created for aspiration of the secondary air. Generally, the secondary air is drawn through a filter device or the like adapted to remove dust particles, pollen and other impurities from the air circulated within the room.

Such high-pressure air-conditioning installations are, for the most part, employed in skyscrapers and other large office buildings as well as in apartment houses and the like. The primary air stream consists of air drawn in from the exterior, filtered and passed through temperature-treatment or heat-exchange devices prior to distribution to the individual rooms. The temperature-treatment means may serve to warm or cool the air stream depending upon weather conditions. The primary air stream is conveyed under high or medium pressure through ducts of limited diameter to the individual induction apparatuses comprised of one or more nozzles opening into the aforementioned plenum chamber through which the secondary air stream is circulated and admixed with the primary stream. Consequently, a temperature equalization between the primary and secondary air was effected. Frequently, the induction apparatus was provided with heat-exchanger means through which the secondary air was drawn. Such heat-exchanger means comprised a plurality of tubes through which a heating or cooling fluid was passed so that, in winter, warm water flowing through the tubes heated the air circulated through the room while, in summer, cold water flowing through the tubes cooled the air. The provision of filters forwardly of the induction nozzles, which intercepted the secondary air prior to its admixture with the primary air, was found to reduce the efficiency of induction devices of this type owing to the flow resistance of such filters. To insure the maintenance of a required secondary air circulation, it was necessary heretofore to increase the velocity and quantity of the primary air. Difficulties were also experienced in the use of heat exchangers having closely spaced ribbed or finned tubes since such heat exchangers also reduced the velocity of the secondary air stream and resulted in unsatisfactory heating or cooling of the air circulated within the room. Particularly in the summer, when a heat exchanger was disposed below the discharge grill or opening of the apparatus housing, poor results were noted. It was found that the aspiration of the secondary air via the primary air stream at the nozzles was insufficient to prevent cooled air from descending and, thereby, flowing counter to the desired circulation.

The regulation and control of these known induction-type apparatuses was generally effected by hand via throttling valves for controlling the flow of fluid through the heat exchanger or flap valves in the primary-air device.

It is, therefore, an object of the present invention to provide an air-conditioning installation adapted to obviate the disadvantages of hitherto existing units of the character described.

It is a more specific object of the invention to provide an induction-type air-conditioning unit wherein the secondary-air flow is not materially restricted by the filter means or like fluid-permeable objects in its path.

These objects are realized, in accordance with the invention, by providing an induction apparatus having a housing forming a plenum chamber, with nozzle means for discharging a primary air stream under relatively high pressure into said chamber for aspirating a secondary air stream into the latter, and blower means interposed between an inlet for the secondary air and the nozzle means for displacing the secondary air. Advantageously, the blower means is disposed behind the filter and forwardly of the heat-exchanger device. Thus, the filter may be provided at the aforementioned inlet opening while the heat exchanger is spaced therefrom, the blower means being disposed in the gap between them for circulating sufficient secondary air, irrespective of the primary air flow to effect the requisite conditioning of the ambient air.

According to a further feature of the invention, the heating or cooling effect of the apparatus is regulated by controlling the quantity of air displaced by the blower. It will be apparent, therefore, that cooling fluid may be passed through the heat-exchanger tubes at the rate of cooling reduced by increasing the flow rate of the secondary air pumped by the blower means. The displacement of air by the latter may be adjusted by controlling its inlet aperture or its rate of operation (e.g. the rate of rotation of its shaft). An air-conditioning installation according to the present invention has been found to require a minimum quantity of fresh air (i.e. primary air) so that the ducts for this air stream can be proportionally smaller than the ducts employed in hitherto known devices. Since a blower is provided in each induction apparatus, even at reduced flows of the primary air, sufficient secondary air can be circulated within the room through the filter to substantially render the air free from dust and pollen. The temperature control at each induction apparatus can be individually and automatically adjusted without altering the primary air flow and compensation can be made for the number of persons in each room and the requisite cooling or heating effect. Moreover, owing to the high rate of secondary air flow, there is substantially little temperature difference between the air emanating from the apparatus and the air within the room so that a more uniform cooling results. Since the rate of flow of the primary air is reduced, a corresponding reduction in the noisiness of the apparatus is experienced.

The above and other objects, features and advantages of the present invention will become more readily apparent from the following description, reference being made to the accompanying drawing in which:

FIG. 2 is a cross-sectional view taken along the line II—II of FIG. 1 with parts broken away;

FIG. 3 is a diagrammatic cross-sectional view of a multistoried building employing an air-conditioning installation according to the instant invention.

Figure 1:
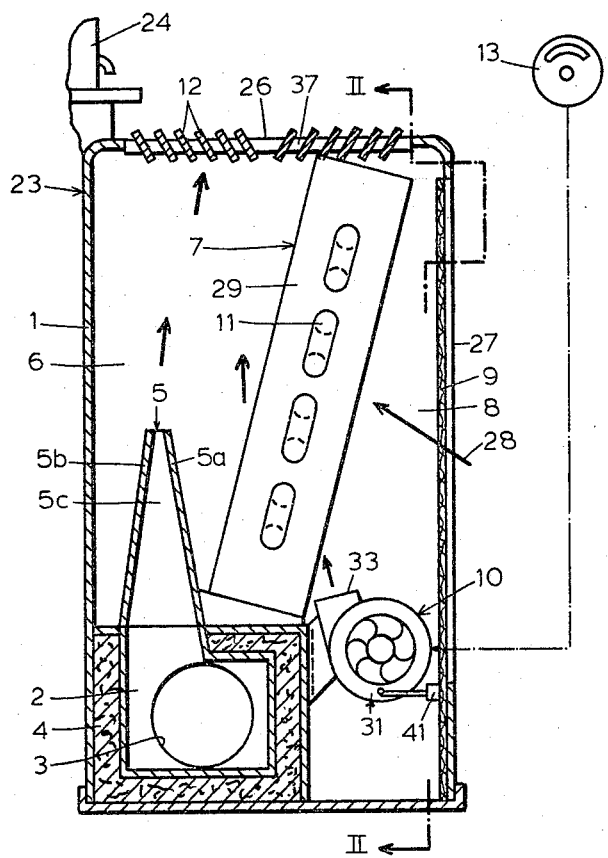
FIG. 1 is a side cross-elevational view of an induction apparatus employed in a central air-conditioning installation according to the invention.
Figure 4:
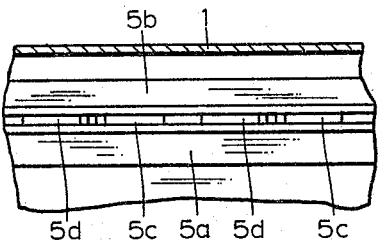
FIG. 4 is a plan view of the primary air nozzles of the apparatus shown in FIGS. 1 and 2.

As may be seen from FIG. 3, an air-conditioning installation in accordance with the present invention comprises a central unit 20 of the conventional type which draws air from the exterior of the building 21, filters it, thermally alters it if necessary by raising or lowering its temperature, dehumidifies or washes it and distributes it via a main duct 22 to the individual air-conditioning apparatuses 23 located throughout the structure. These induction apparatuses which generally are located below the windows 24, are fed from the main duct 22 by branch ducts 25 whose cross-sectional areas are, of course, individually less than that of the main duct. As can be seen in FIGS. 1, 2 and 4, the induction apparatus 23 in in each room comprises a casing 1 of sheet metal or other relatively thin material which encloses a plenum chamber 6. A quieting chamber 2 surrounded by sound-absorbing material 4 such as rock wool, fiber glass or like insulation is fed by the ducts 25 through an inlet opening 3 and supplies the longitudinally spaced jets or nozzles 5 through which the primary air is discharged into the plenum chamber. These nozzles are formed by a pair of longitudinally extending upwardly converging plates 5a, 5b and transverse plates 5c, 5d likewise converging upwardly towards the mouth of the nozzle.

A heat exchanger 7 is disposed within the plenum chamber intermediate the outlet 26 and the inlet 27 thereof. At the inlet I provide a filter 9, e. g. of the fiber glass, fiber or fabric type, which forms with the heat exchanger a compartment 8 through which secondary air is aspirated in the direction indicated by the arrow 28. Blower means 10 is disposed in the compartment 8 for the forced displacement of at least part of the secondary air past the heat exchanger toward the outlet 26. The heat exchanger means 7 comprises a pair of supporting plates 29, 30 which carry a generally planar array of ribbed or finned tubes 11 best seen in FIG. 2. These tubes have an extremely large radiator surface area so that cooling or heating of the secondary air stream is accomplished at a rapid rate. The blower means 10 comprises a pair of axial-intake blowers 31, 32 whose tangential outlets 33, 34 are directed outwardly toward the heat exchanger 7. The rotors of these blowers are secured to a common shaft 35 which is driven by a motor 36. At the outlet 26, I provide jalousie-type deflectors 12 which are pivoted at their extremities 37 to the casing 1 in order to permit them to be set as required.

In operation, a substantially constant amount of primary air is distributed by the central unit 20 to each of the individual induction units 23 via the ducts 22 and 25. The reduced pressure at the mouth 5e of each nozzle 5 in the plenum chamber 6, in the manner of a venturi-type injector, aspirates air through the filter 9 and the inlet 27 past the heat exchanger 7 whence it admixes with the primary air and is entrained therewith through the outlet 26. Supplementing the aspiration of the secondary air into the plenum chamber, blower means 10 draws additional secondary air through the filter and forces it past the heat exchanger 7 towards the outlet 26. While the temperature of the outgoing mixture of primary and secondary air may be controlled by regulating the flow of heating or cooling fluid through the tube 11 via the valve 38, I prefer to provide automatic temperature control. Thus, for example, an adjustable thermostat 13 may be provided to control the rate of operation of the blowers 31, 32. This thermostat may comprise a bimetallic strip 13a connected in series with a source 39 of electric current for increasing the speed of the motor 36 whenever the temperature in the room falls below or rises above a predetermined level. The motor 36 may be a 2-speed motor which runs at a relatively slow continuous first speed and is only switched to its relatively high second speed when the thermostat 13 energizes an additional winding thereof. The thermostat 13 is provided with a knob 13d which can serve to displace the counter contacts 13b and 13c thereof closer to or further from the bimetallic strip 13a in order to adjust the threshold temperatures of the device. A 2-pole switch 13e is provided for selective energization of the contacts 13b and 13c depending upon whether the thermostat 13 is to respond to a decrease or an increase in room temperature. Other control means for the blower means 10 may comprise a diaphragm-type shutter 40 which is shifted by a solenoid 41 upon closure of a bimetallic thermostat switch 42 in order to limit the flow of air into the blower 31. The diaphragm 43 of blower 32 is controlled by a servomotor 44 which responds to the rotation of a master motor 45 as controlled by a temperature-sensing bridge 46 for providing continuous control of the intake opening of blower 32 in response to temperature changes.

As may be seen from FIG. 3, each of the apparatuses 23 is provided with an individual adjustable thermostat 13 for independent control of the temperature in each room.

The invention as described and illustrated is believed to admit of many modifications and variations within the ability of persons skilled in the art, all such modifications being deemed included within the spirit and scope of the appended claims.

I claim:
1. In an air-conditioning installation, in combination, a housing forming a plenum chamber having a top and a bottom; heat-exchanger means in said chamber subdividing it into a first compartment having a first inlet and an outlet spaced above said inlet and a second compartment communicating with said first compartment and having a second inlet remote from said first inlet; a quieting chamber in said housing and opening into said first compartment; a source of primary air communicating with said first compartment through said quieting chamber and discharging said primary air into said first compartment through said first inlet under relatively high pressure and in the direction of said outlet, said first inlet being constituted as Venturi-nozzle means having a longitudinal array of orifices directly juxtaposed with said outlet and parallel to said heat-exchanger means for ejecting said primary air from said orifices to create a condition of lowered pressure in said first compartment, thereby inducing a flow of secondary air from the exterior into said housing through said second inlet and along a path toward said outlet; filter means at said housing disposed in said path; and blower means disposed in said second compartment below said inlets and along said path remote from said outlet for forced circulation of said secondary air through said heat-exchanger means into said first compartment and subsequent admixture therein with said primary air prior to the exit thereof through said outlet.

2. The combination defined in claim 1 wherein said blower means has a variable-speed drive motor, said installation further comprising thermosensitive means operatively connected with said motor for automatically controlling the rate of secondary-air flow in response to ambient temperature conditions.

3. The combination defined in claim 1 wherein said heat-exchanger means comprises a substantially planar array of fluid-conducting tubes.

4. The combination defined in claim 1 wherein said filter means is disposed in said housing adjacent said second inlet.

References Cited by the Examiner
UNITED STATES PATENTS

| | | | |
|---|---|---|---|
| 2,327,664 | 8/1943 | Otis | 98—38 |
| 2,633,070 | 3/1953 | Gillham | 98—38 |
| 2,913,227 | 11/1959 | Bottorf et al. | 98—38 |

ROBERT A. O'LEARY, *Primary Examiner.*
CHARLES SUKALO, FREDERICK L. MATTESON, Jr., *Examiners.*